United States Patent [19]

Proehl et al.

[11] Patent Number: 4,876,181

[45] Date of Patent: Oct. 24, 1989

[54] PHOTOGRAPHIC ELEMENTS CONTAINING INFRARED FILTER DYES

[75] Inventors: Gary S. Proehl; Anthony D. Gingello, both of Rochester; David J. Collett, Walworth; Richard L. Parton, Webster; David A. Stegman, Churchville; Anthony Adin, Rochester, all of N.Y.

[73] Assignee: Eastman Kodak Company, Rochester, N.Y.

[21] Appl. No.: 166,135

[22] Filed: Mar. 10, 1988

Related U.S. Application Data

[63] Continuation-in-part of Ser. No. 41,954, Apr. 24, 1987, abandoned, which is a continuation-in-part of Ser. No. 881,312, Jul. 2, 1986, abandoned.

[51] Int. Cl.$^4$ .................................................. G03L 1/84
[52] U.S. Cl. ..................................... 430/522; 430/512; 430/517; 430/592; 544/372; 548/427
[58] Field of Search ............... 430/512, 517, 520, 592; 548/427; 544/372

[56] References Cited

U.S. PATENT DOCUMENTS

| | | | |
|---|---|---|---|
| 2,968,566 | 1/1961 | Riester | 430/522 |
| 3,482,978 | 12/1969 | Fremia, Jr. et al. | 96/84 |
| 3,615,544 | 10/1971 | Amano et al. | 430/529 |
| 3,866,812 | 2/1975 | Kobayashi et al. | 430/522 |
| 4,362,800 | 12/1982 | Takimoto et al. | 430/83 |
| 4,581,325 | 4/1986 | Ketchin et al. | 430/522 |

OTHER PUBLICATIONS

C.A. 11846u, Chemical Abstracts, vol. 66, 1967, p. 1172, Smith.
Abstract of Japanese Patent 62123454, 1962.

*Primary Examiner*—Jack P. Brammer
*Attorney, Agent, or Firm*—Paul L. Marshall

[57] ABSTRACT

A dye useful for absorbing infrared radiation in photographic elements, having the structure:

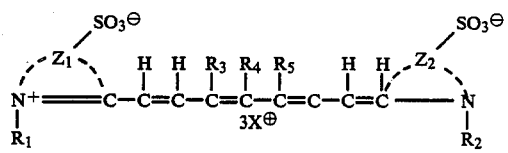

is disclosed.

In this formula $R_1$ and $R_2$ each independently represents sulfoalkyl, carboxyalkyl, or sulfatoalkyl of from 3 to 6 carbon atoms, having at least 3 carbon atoms in the alkyl chain between the nitrogen atom of each Z ring and the sulfo or sulfato group, and at least 2 carbon atoms in the alkyl chain between the nitrogen atom of each Z ring and the carboxy group.

$R_3$ and $R_5$ are each hydrogen or together represent the atoms necessary to complete 5- or 6-membered carbocyclic ring, and $R_4$ represents hydrogen, alkyl of 1 to 4 carbon atoms, aryl, cyano, halogen, or

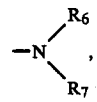

where $R_6$ and $R_7$ each independently represents alkyl of from 1 to 6 carbon atoms or aryl, or together represent the non-metallic atoms necessary to form a 5- or 6-membered ring.

$X\oplus$ represents a cation.

$Z_1$ and $Z_2$ each independently represent the atoms needed to complete an indole, naphthindole or benzindole nucleus.

8 Claims, No Drawings

PHOTOGRAPHIC ELEMENTS CONTAINING INFRARED FILTER DYES

This is a continuation-in-part of earlier filed application Ser. No. 041,954, filed on Apr. 24, 1987, now abandoned, which is a continuation-in-part of earlier filed application Ser. No. 881,312, filed on July 2, 1986, now abandoned.

FIELD OF THE INVENTION

The present invention relates to infrared absorbing dyes and photographic elements comprising a layer containing such dyes.

BACKGROUND OF THE INVENTION

Photographic elements having layers comprising filter dyes are known. These filter dyes may be used for a variety of purposes, such as absorber dyes in photographic emulsion layers to improve the image sharpness of that layer, general purpose filter dyes for absorbing light of a particular wavelength so it does not expose or exposes at a reduced intensity a lower layer in the element, or as antihalation dyes to reduce halation in the image-forming layers.

Filter dyes may be present in essentially layer of a photographic element where it is desired to absorb radiation in the region of the spectrum where the dye absorbs light, such as an interlayer, a radiation-sensitive layer, an overcoat layer, an undercoat layer, a backing layer, or others known in the art. Absorber dyes (also called intergrain absorber dyes) are generally present in the radiation-senstive layers of photographic elements. Antihalation layers may be located on either side of a transparent support carrying radiation sensitive layers, particularly silver halide emulsion layers. Moreover, such antihalation layers may be coated between two or more silver halide emulsions layers in a multilayer element or as a backing layer on the side of the support away from the light sensitive layers.

The development of information recording equipment using semiconductor laser diodes emitting in the infrared spectral region has required a parallel development of photographic elements, particularly silver halide photographic elements, with appropriate spectral sensitivity. Such elements often require the presence of filter dyes that absorb infrared radiation in one or more layers of the element, for example, as antihalation dyes or absorber dyes.

Such filter dyes should:

(1) filter light in the region from about 730 nm to about 900 nm, depending on the emission wavelength of the laser diode (a common laser emission wavelength is about 800 nm and other typical laser emission wavelengths are about 750, 780, 820, and 870 nm), (2) be water soluble at levels of at least 5 mg/ml so as to allow aqueous dissolution of the dye and provide compatibility with hydrophilic layers, and (3) leave little or no stain in the processed film.

U.S. Pat. No. 4,362,800 discloses 1,1,1'1'-tetramethyl-3,3'-bis(sulfoalkyl)-1H-benz[e]indolotricarbocyanine sodium salt. This dye has been used with some success as a photographic filter dye, but it tends to leave a greenish stain after processing. Such a stain is objectionable. Thus, a nonstaining infrared filter dye is needed.

SUMMARY OF THE INVENTION

The present invention provides infrared-absorbing filter dyes having the formula:

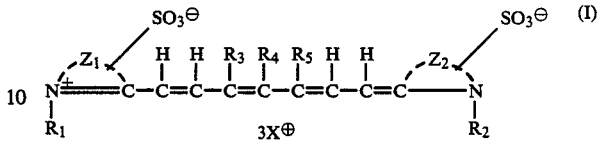

In this formula, $R_1$ and $R_2$, each independently represent sulfoalkyl, carboxyalkyl, or sulfatoalkyl of from 3 to 6 carbon atoms, having at least 3 carbon atoms in the alkyl chain between the nitrogen atoms of each Z ring and the sulfo or sulfato group, and at least 2 carbon atoms in the alkyl chain between the nitrogen atom of each Z ring and the carboxy group.

$R_3$ and $R_5$ are each hydrogen or together represent the atoms necessary to complete 5- or 6-membered carbocyclic ring, and $R_4$ represents hydrogen, alkyl or 1 to 4 carbon atoms, aryl, cyano, halogen, or

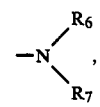

where $R_6$ and $R_7$ each independently represents alkyl of from 1 to 6 carbon atoms or aryl, or together represent the non-metallic atoms necessary to form a 5- or 6-membered ring.

$X^\oplus$ represents a cation.

$Z_1$ and $Z_2$, each independently represent the atoms needed to complete an indole, naphthindole or benzindole nucleus.

Such dyes can be used in conjunction with a deaggregating compound to form effective filter dye compositions in infrared-sensitive photographic elements, without leaving an objectionable post-processing stain.

Description of the Preferred Embodiments

Dyes of the invention are those of formula (I). With such dyes according to formula (I), $R_1$ and $R_2$ each independently represent sulfoalkyl, carboxyalkyl, or sulfatoalkyl of from 3 to 6 carbon atoms. Additionally, substituted sulfoalkyl, carboxyalkyl, and sulfatoalkyl are useful as $R_1$ and $R_2$. Such groups may be substituted with substituents such as methyl, hydroxy, and halogen such as Cl or F. Examples of $R_1$ and $R_2$ include 3-sulfopropyl, 3-sulfobutyl, 4-sulfobutyl, 3-sulfatopropyl, 3-carboxypropyl, and 2-hydroxy-3-sulfopropyl.

$R_3$ and $R_5$ each independently represent hydrogen or together represent the atoms necessary to complete a 5- or 6-membered carbocyclic ring, such as cyclopentenyl or cyclohexenyl. Substituted carbocyclic rings (substituted with, for example, alkyl, halogen, or hydroxy) are also useful as $R_3$ and $R_5$ (e.g., 5-hydroxycyclohexenyl or 5,5'-dimethyl-cyclohexenyl).

$R_4$ represents hydrogen, alkyl of from 1 to 5 carbon atoms, such as methyl, ethyl, or propyl, cyano, halogen (e.g., F, Cl, I), or

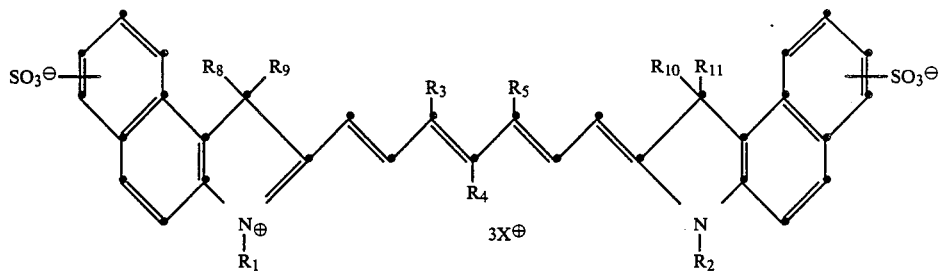

where $R_6$ and $R_7$ each individually represent alkyl of from 1 to 6 carbon atoms (e.g., methyl, ethyl, propyl), aryl (e.g., phenyl, p-methoxyphenyl), or together represent the non-metallic atoms necessary to complete a 5- or 6-membered heterocyclic ring. Examples of such heterocyclic ring groups include morpholino, thiomorpholino, and piperazino, such as 4-ethoxycarbonyl-1-piperazino and 4-methyl-1-piperazino. Additionally, substituted alkyl, aryl, or heterocyclic rings are useful as $R_6$ and $R_7$. Useful substituents include hydroxy, alkoxy, and halogen, and useful substituted groups include 4-methoxyphenyl, hydroxyethyl, methoxyethyl, and 4-chlorophenyl.

It is contemplated herein that indole, naphthindole, or benzindole nuclei that are substituted with substituents such as halogen (e.g., Cl, F), hydroxy, alkoxy (e.g., methoxy), or aryl (e.g., phenyl, 4-methoxyphenyl) are also useful as $Z_1$ and $Z_2$ according to the present invention.

A preferred class of dye compounds according to formula (I) are represented by formula: (II)

where $X^+$, $R_1$, $R_2$, $R_3$, $R_4$, and $R_5$, are as defined above, $R_8$, $R_9$, $R_{10}$ and $R_{11}$ each independently represent methyl or ethyl, or $R_8$ and $R_9$ or $R_{10}$ and $R_{11}$, taken together with the carbon atoms to which they are attached, may form a cycloalkyl group.

The dyes of this invention can be made according to the procedures of U.S. Pat. Nos. 2,895,955, 3,148,187, and 3,423,207. Such a preparation procedure is illustrated in Example 1 infra.

Examples of such dyes include

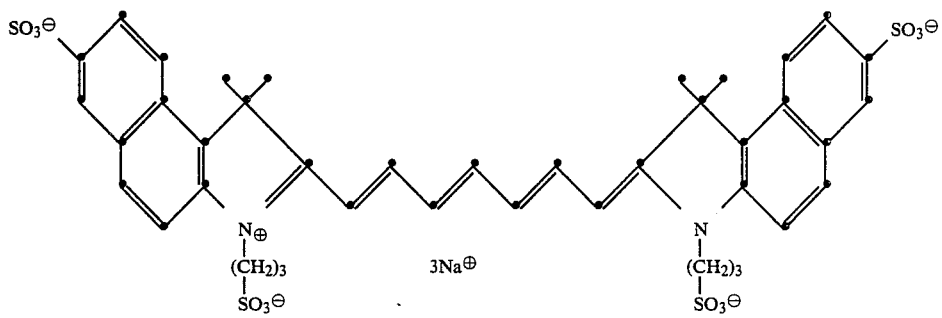

and

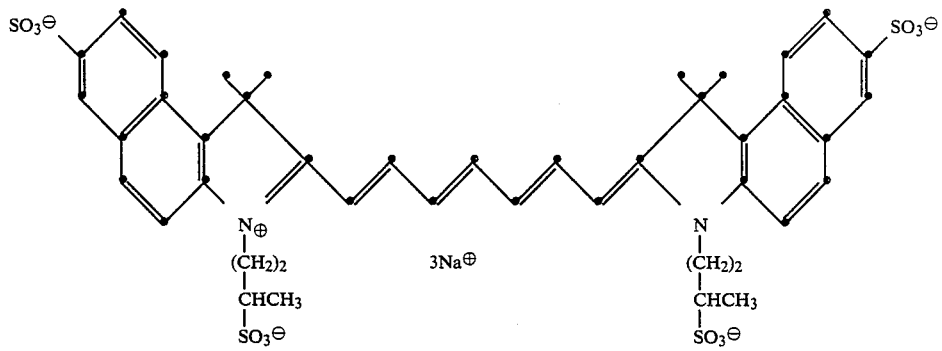

A deaggregating compound, or deaggregant, is often useful to enable the dyes of the invention to have the desired absorption maximum wavelength. These dyes have an absorbance maximum in the desired wavelength range in molecular form, but aggregate to cause a shift in the maximum absorbance wavelength. This can easily be determined by simply measuring the absorbance maximum with and without a deaggregant. Further information on aggregation is disclosed in James, *The Theory of the Photographic Process*, 4th, 218–22

(1977) and in Herz, Photographic Science & Engineering, 18, 323 (1974), the disclosures of which are incorporated herein by reference.

The amount of deaggregant needed to effectively deaggregate a dye of the invention in a hydrophilic colloid layer will vary according to the particular dye of the invention and the particular deaggregant selected, as shown in Example 5 and Table IV infra. However, one skilled in the art can easily establish the effective level of deaggregant by obtaining a series of spectrophotometric curves showing the effect of varying concentrations of the selected deaggregant on the absorption behavior of the dye. The point at which the concentration level of the deaggregant produces the desired absorption maximum will be the optimum amount of deaggregant.

Any of a number of well-known deaggregating compounds will be useful in combination with the dyes of the invention. Table I presents a list of useful deaggregating compounds.

TABLE I

| Deaggregating Compounds | |
|---|---|
| Deaggregant No. | Name |
| 1 | 4,4'-Bis[4,6-bis(2-chloroanilino-s-triazin-2-yl)-amino]-2,2'-stilbene-disulfonic acid, disodium salt |
| 2 | Bis[3-methyl-1-(4-sulfophenyl)-2-pyrazolin-5-one-(4)]methineoxonol |
| 3 | Bis[3-methyl-1-(4-sulfophenyl)-2-pyrazolin-5-one-(4)]pentamethineoxonol |
| 4 | Bis[3-carboxy-1-(4-sulfophenyl)-2-pyrazolin-5-one(4)]trimethineoxonol disodium salt |
| 5 | Bis[1-butyl-3-carboxymethylbarbituric acid(5)]trimethineoxonol |

The dyes of formula (I) can be incorporated in a photographic element in any amount known to be effective as a filter dye in photographic elements. In a preferred embodiment, the dyes of the invention are in a hydrophilic colloid layer of a photographic element at a concentration of from 0.1 to 500 mg/ft$^2$. The deaggregant is preferably present in an amount of from 25 to 10,000 weight percent, based on the weight of the dye.

When used as an antihalation dye, the dye of formula (I) is preferably present in a layer at a level of from 1 to 500 mg/ft$^2$ and more preferably from 5 to 100 mg/ft$^2$. Antihalation layers are prepared by coating on the photographic element or on its support, by methods well-known in the art, a water solution of the dye, the deaggregant, a hydrophilic colloid binder and a coating aid such as saponin.

When used as an absorber dye in a photosensitive layer of a photographic element, the dye of formula (I) is preferably present at a level of from 0.1 to 50 mg/ft$^2$ and more preferably from 0.3 to 20 mg/ft$^2$. Such layers are prepared by coating on the photographic element or on its support, by methods well-known in the art, an emulsion of silver halide grains, a hydrophilic colloid binder, and the dye, as well as other addenda known to be included in photosensitive layers, such as sensitizing dyes (e.g., infrared-sensitizing dyes), dye-forming image couplers, and the like.

For many purposes, it is desirable to add agents to harden the colloidal binder material so that the filter dye-containing layer remains intact in the photographic element during and following the processing operation. The pH of the coating solution is adjusted when necessary by the usual methods to a level that is compatible with the light-sensitive emulsion layer.

The proportions of dye, deaggregant, water-permeable hydrophilic colloid binder, hardener, silver halide (if present), sensitizing dye (if present), and coating aid used in making layers containing the filter dye of formula (I) may be varied over wide ranges and will depend upon the specific requirements of the photographic element being produced. The method used to determine the optimum composition is well known in the art and need not be described here.

The photographic elements may be coated on any suitable support material used in photography such as polyethylene terephthalate, cellulose nitrate, cellulose acetate, papers, etc.

Hydrophilic colloidal materials used as binders include gelatin, gelatin substitutes, colloidion, gum arabic, cellulose ester derivatives such as alkyl esters of carboxylated cellulose, hydroxy ethyl cellulose, carboxy methyl hydroxy ethyl cellulose, synthetic resins, such as the amphoteric copolymers described by Clavier et al, in U.S. Pat. No. 2,949,442, issued Aug. 16, 1960, polyvinyl alcohol, and others well known in the art.

Examples of polymeric gelatin substitutes are copolymers of allylamine and methacrylic acid, copolymers of allylamine, acrylic acid and acrylamide, hydrolyzed copolymers of allylamine, methacrylic acid and vinyl acetate, the copolymers of allylamine, acrylic acid and styrene, the copolymers of allylamine, methacrylic acid and acrylonitrile, etc.

The dye and the deaggregant are generally added to the water-permeable colloidal binder in water or methanol solution. Usually a coating aid, such as saponin, is added to the dyed colloidal suspension before coating it as a layer on the photographic element.

The photographic elements utilizing the filter dyes of formula (I) have infrared light-sensitive emulsion layers. Such layers may contain silver chloride, silver bromide, silver chlorobromide, silver iodide, silver bromoiodide, silver chlorobromoiodide, etc., as the light-sensitive material. Indeed, any infrared absorbing light-sensitive silver halide emulsion layer may be used in these photographic elements. The silver halide emulsion are sensitized for infrared absorption by any of the sensitizers commonly used to produce the desired sensitometric characteristics.

Methods of making such elements, the means for sensitizing them to infrared radiation and the incorporation of filter dyes in silver halide emulsion layers or antihalation layers are well known and need not be described herein. Detailed teachings in this regard can be obtained from Research Disclosure, 1978, Item 17643 entitled "Photographic Silver Halide Emulsions, Preparations, Addenda, Processing and Systems."

The practice of the invention is further illustrated by the following examples. The structures of the dyes of the Examples are given in the Tables II and III.

TABLE II
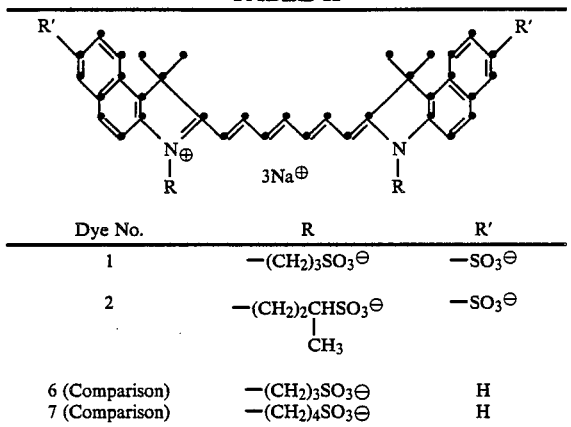
| Dye No. | R | R' |
|---|---|---|
| 1 | —(CH$_2$)$_3$SO$_3^\ominus$ | —SO$_3^\ominus$ |
| 2 | —(CH$_2$)$_2$CHSO$_3^\ominus$<br>　　　　　\|<br>　　　　　CH$_3$ | —SO$_3^\ominus$ |
| 6 (Comparison) | —(CH$_2$)$_3$SO$_3^\ominus$ | H |
| 7 (Comparison) | —(CH$_2$)$_4$SO$_3^\ominus$ | H |
TABLE II-continued
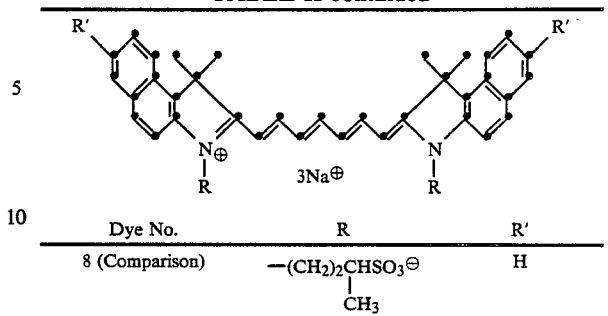
| Dye No. | R | R' |
|---|---|---|
| 8 (Comparison) | —(CH$_2$)$_2$CHSO$_3^\ominus$<br>　　　　　\|<br>　　　　　CH$_3$ | H |
TABLE III
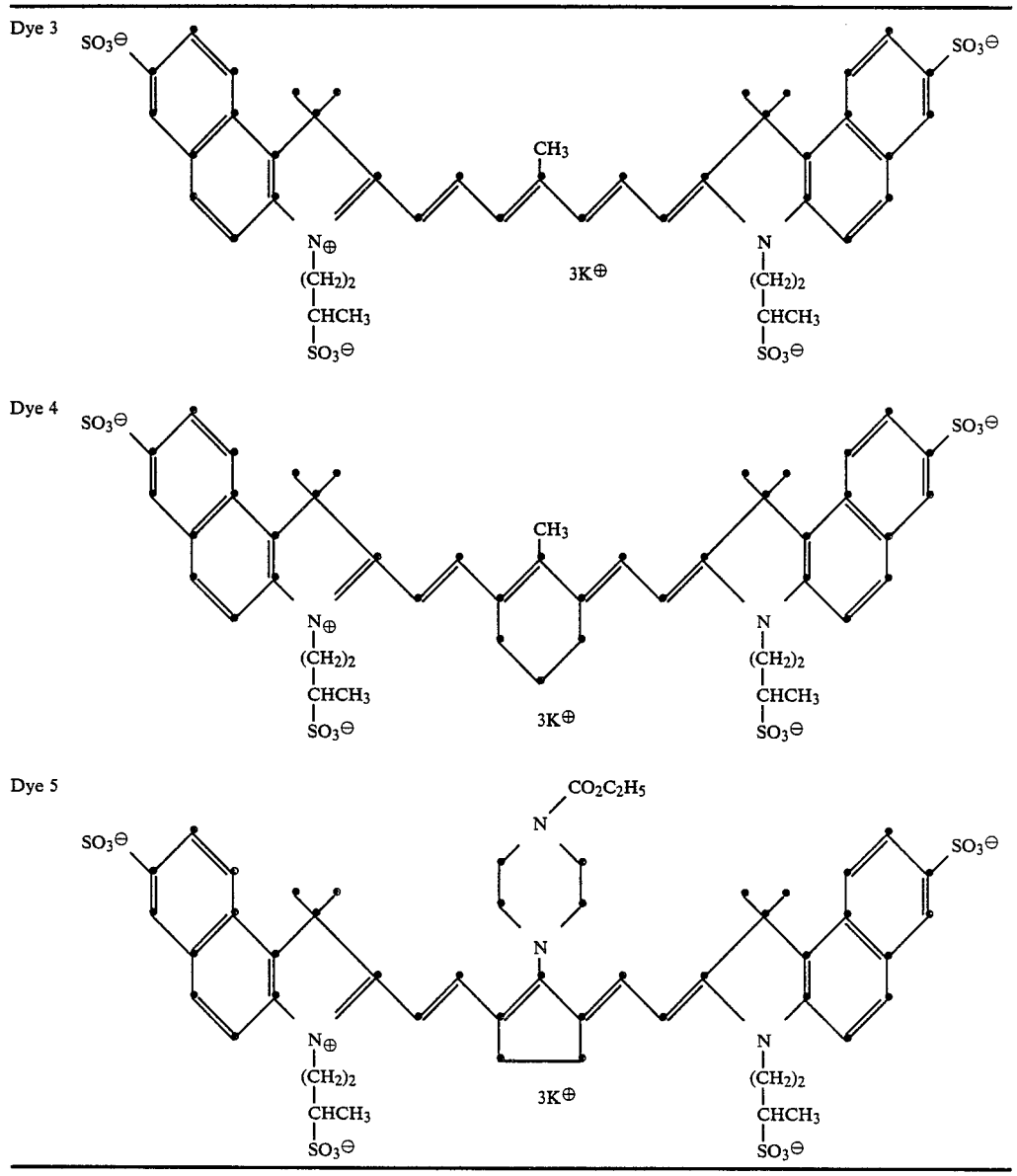

Example 1: Preparation of Dye 2 of Table II

Step A—Preparation of 7-Sulfo-1,1,2-trimethyl-1H-benz[e]indole (Intermediate A)

1,1,2-Trimethyl-1H-benz[e]indole, 100 g. was added with stirring to 500 mL of concentrated $H_2SO_4$. The mixture was heated at 180° C. for ½ h, cooled to 60° C. and poured onto 2 Kg ice. Cautiously 500 ml of 50% aqueous NaOH was added. After 24 hours at room temperature the solid was filtered off, and 500 mL of saturated aqueous $Na_2SO_4$ was added. The resulting solid precipitate was collected, added to the previously filtered solid, and recrystallized from 2 L of $H_2O$. Yield 25 g after overnight vacuum drying at 50° C. The location of the sulfo group was determined as being the 7-position by proton nuclear magnetic resonance measurements.

Step B—Preparation of Anhydro-7-sulfo-3-(3-sulfobutyl)-1,1,2-trimethyl-1H-benz[e]indolinium Hydroxide (Intermediate B)

A mixture of 28 g of 7-sulfo-1,1,2-trimethyl-1H-benz[e]indole (Intermediate A) and 40 g of 2,4-butanesultone was stirred and slowly heated to an internal temperature of 210° C. over a period of 1.5 h. The reaction mass was held at 210° C. for 20 minutes until a homogeneous brown liquid was obtained. After cooling to room temperature, the solidified mass was dissolved in 100 mL of boiling methanol. After cooling to room temperature, the solid that precipitated was collected by suction filtration. This solid was suspended in 500 mL of acetone with stirring. Filtration and drying at 0.5 mm Hg overnight gave 35 g (85%) of light gray solid. The infrared spectrum was in agreement with the expected structure.

Step C—Preparation of Anhydro-3,3'-di(3-sulfobutyl)-7,7'-disulfo-1,1,1',1'-tetramethylbenz[e]indolotricarbocyanine Hydroxide Trisodium Salt (Dye 2 of Table II)

With good stirring, a suspension of 10.0 g of Intermediate B and 3.4 g of glutacondialdehydedianil hydrochloride was formed in 50 mL of acetonitrile. Four ml of triethylamine was added, followed by 4 mL of acetic anhydride. An additional 4 ml of triethylamine was added, and the mixture was then refluxed for 5 min. After cooling to room temperature in the dark, a solution of 5.5 g of sodium iodide dissolved in 10 mL of methanol was added. The precipitated solid was collected and washed with fresh acetonitrile. After drying at 0.5 mm Hg for 2 h, there remained 10.0 g (87%) of green powder, $\epsilon = 23.5 \times 10^4$ at 784 nm in methanol.

Example 2: Preparation of Dye 3 of Table III 2.0 g of intermediate B of Example 1 and 0.8 g 3-methylglutacondialdehyde dianil bromide were combined in 10 ml pyridine and 2 ml triethylamine and heated at reflux for 15 minutes. After cooling, the mixture was diluted with either with stirring. The ether phase was decanted and the remaining product was dissolved in hot methanol and filtered. Excess potassium acetate was added to the filtrate and the resulting precipitate was collected and recrystallized from a 50/50 mixture of methanol and water to yield Dye 3 of Table III, λ-max=806 nm in methanol/water, $\epsilon$-max=24.79×10$^4$.

Example 3: Preparation of Dye 4 of Table III 8.5 g of intermediate B of Example 1 and 3.3 g 3-methyl-2,4-trimethyleneglutacondialdehydedianil were combined in 5 ml acetic anhydride and 100 ml pyridine and heated at reflux for 5 minutes. After cooling, the mixture was diluted with 500 ml of ether with stirring. The ether phase was decanted and the remaining product was dissolved in 50 ml of hot pyridine and water. Excess potassium acetate was added and the mixture was cooled to room temperature. The resulting precipitate was collected and dried to yield Dye 4 of Table III, λ-max=806 nm in methanol/water, $\epsilon$-max=26.82×10$^4$.

Example 4: Preparation of Dye 5 of Table III 2.1 g of intermediate B of Example 1 and 1.3 g 1-[2,5-bis(anilinomethylene)cyclopentylidene]-4-ethoxycarbonylpiperazinium tetrafluoroborate were combined in 5 ml triethylamine and 20 ml dimethylformamide and heated at reflux for 5 minutes. After cooling, the mixture was diluted with ether with stirring. The ether phase was decanted and the remaining product was dissolved in a 50/50 mixture of methanol and water. Excess potassium acetate dissolved in methanol was added and the resulting precipitate was recrystallized from a 50/50 mix of methanol and water to yield Dye 5 of Table III. λ-max=738 nm (MeOH9, $\epsilon$-max=15.34×10$^4$.

Example 5:

This example illustrates: (a) the desirable absorption but severe post processing stain problem of comparison dyes having structures similar to the dyes of this invention (comparison dyes 6, 7 and 8), (b) aggregation with resulting poor absorption in the infrared region or severe stain, or both, of the dyes 1–5 of this invention when coated alone, (c) the desired absorption and lower residual stain of dyes 1–5 of this invention when coated with deaggregants from Table I.

Coating compositions of the examples were prepared by adding the components, at predetermined levels based on the coverages desired in coated layers of the composition, to a hydrophilic material such as gelatin. In these examples the compositions were coated on a polyethylene terephthalate support to achieve gelatin coverage of 3.14 g/m$^2$ and component coverage as listed in Table IV. Absorption spectra were obtained using a Diano Match Scan II Spectrophotometer before and after processing.

Process was by the rack and tank method with development for 30 s at 38° C. in Kodak Rapid Scanner Developer, fixing at 38° C. in Kodak Rapid Fixer and washing for 60 s at about 32° C. Total transmittance density measurements made before and after processing to indicate stain levels before and after processing. A visual evaluation was also made of the post-process stain. The results are listed in Table IV. In correlating the visual evaluation of stain with observed spectral curves it should be noted that the eye is sensitive to about 750 nm.

Comparison Dyes 6, 7 and 8 of Table II show strong absorption in the spectral region of interest. However, they also show severe post-processing stain.

Dyes 1–4 of the invention, when coated alone show some absorption in the infrared region, but peak at higher wavelengths, indicating aggregation. The aggregated dyes also result in post-processing stain that ranges from very severe to moderate. However, as Deaggregants 1 or 2 are added, the peaks in the 800 nm region are enhanced, while the absorption at higher wavelengths greatly decreases, indicating deaggregation of the dyes of the invention. Dye 5 has an aggregate absorption in the region of interest, but also causes very severe post-processing stain when coated without a deaggregant. This stain is greatly reduced when a deaggregant is utilized.

In Table IV coatings 7, 10, 12, 14, 16, and 18 contain dye and deaggregant compositions of the invention. Coatings 1, 2 and 3 contain dyes 6, 7 and 8, respectively, identified in Table II as comparison dyes. Coatings 4, 5, 6, and 7 contain dye 1, alone or in combination with deaggregant 2, identified in Table I. Coatings 8–12 contain dye 2, alone and in combination with deaggregants 1 or 2. The compositions of coatings 5, 6, 9 and 11 are not of this invention because the levels of deaggregant are not sufficient to be effective. Coatings 13, 15 and 17 contain dyes 3, 4, and 5 of the invention coated without a deaggregant. Coatings 14, 16, and 18 contain dyes 3, 4, and 5 of the invention coated with deaggregant 2 of Table I.

In Table IV, the stain evaluation, done visually is recorded using the code VS=very severe, S=severe, M=moderate, SL=slight and BD=barely detectable. Other symbols include * which indicates that the dye in this coating had an aggregate peak beyond 900 nm. The optical density (OD) of the aggregate peak is much higher than the maximum in the table. λ-max is the peak with the highest OD in the 300 to 900 nm region λ-sec indicates a secondary maximum or, in most cases, a shoulder (labeled s) or slight curve inflection (labeled i).

Example 6:

This coating Example illustrates the deaggregation of Dye 2 of the invention when coated in the presence of Deaggregants 2, 3, 4 and 5 of Table II.

The coatings were prepared using a 12% solution of gelatin, containing Dye 2 at $1.7 \times 10^{-5}$ molar concentration, and the deaggregants at molar concentrations listed in Table V. The coating melts were applied with a hand coater to polyester support at approximately 130 ml/m$^2$, and were hardened with formaldehyde at 1.39% of the gelatin weight.

After chill setting and drying, the absorption spectra were obtained with a Perkin-Elmer Lambda 5 UV-visible-infrared spectrophotometer.

TABLE V

| Coating No. | Dye V Molarity | Deaggregant | Molarity |
|---|---|---|---|
| 1 | $1.7 \times 10^{-4}$ | — | — |
| 2 | $1.7 \times 10^{-4}$ | II | $3.9 \times 10^{-4}$ |
| 3 | $1.7 \times 10^{-4}$ | III | $2.9 \times 10^{-4}$ |
| 4 | $1.7 \times 10^{-4}$ | IV | $4.4 \times 10^{-4}$ |
| 5 | $1.7 \times 10^{-4}$ | V | $2.0 \times 10^{-4}$ |

Only a small absorption peak at about 800 nm was observed for Dye 2 when coated alone. The major absorption was at wavelengths greater than 900 nm. Enhancement of the 800 nm absorption peak to varying degrees was observed with Deaggregants 2, 3, 4 and 5, indicating that each of these oxonol dyes has a deaggregating effect on Dye 2 of the invention.

Thus, particularly efficacious antihalation layers are formed with a combination of a dye of the invention and a deaggregant from Table III.

TABLE IV

| Coating No. | Dye | Level g/m$^2$ | Add | Level g/m$^2$ | Absorption Data Unprocessed λ-max | OD | λ-sec | OD | Processed λ-max | OD | λ-sec | OD | Stain |
|---|---|---|---|---|---|---|---|---|---|---|---|---|---|
| 1 | 6 | 0.029 | — | — | 732 | 0.495 | 800 | 0.320 | 732 | 0.380 | 800i | 0.252 | VS |
| 2 | 7 | 0.022 | — | — | 802 | 0.390 | 740 | 0.270 | 802 | 0.177 | 740i | 0.125 | S |
| 3 | 8 | 0.022 | — | — | 800 | 0.350 | 735 | 0.290 | 800 | 0.172 | 740s | 0.140 | S |
| 4 | 1 | 0.043 | — | — | 817* | 0.435 | 750i | 0.255 | 822* | 0.360 | 750i | 0.152 | VS |
| 5 | 1 | 0.043 | 2 | 0.269 | 812* | 0.480 | 750i | 0.255 | 822* | 0.312 | 755i | 0.167 | VS |
| 6 | 1 | 0.043 | 2 | 1.080 | 810* | 0.500 | 750i | 0.255 | 822* | 0.250 | 755i | 0.140 | VS |
| 7 | 1 | 0.043 | 2 | 2.150 | 807 | 0.760 | 740s | 0.280 | a | 0.065 | a | 0.055 | BD |
| 8 | 2 | 0.043 | — | — | 805* | 0.350 | 750i | 0.210 | 815 | 0.092 | 730i | 0.057 | M |
| 9 | 2 | 0.043 | 2 | 0.269 | 802* | 0.570 | 740s | 0.260 | 810 | 0.080 | 730i | 0.055 | SL |
| 10 | 2 | 0.043 | 2 | 1.080 | 802 | 0.750 | 735s | 0.285 | a | 0.052 | a | 0.045 | BD |
| 11 | 2 | 0.043 | 1 | 0.022 | 802* | 0.380 | 735s | 0.185 | 810 | 0.102 | 740 | 0.063 | M |
| 12 | 2 | 0.043 | 1 | 0.043 | 801 | 0.700 | 740s | 0.350 | 805 | 0.122 | 735s | 0.070 | SL |
| 13 | 3 | 0.064 | — | — | 850* | 0.437 | — | — | 828* | 0.181 | — | — | M |
| 14 | 3 | 0.064 | 2 | 1.080 | 826 | 0.978 | 760s | 0.397 | 822 | 0.047 | 750s | 0.014 | SL |
| 15 | 4 | 0.064 | — | — | 828* | 0.557 | 765i | 0.280 | 823 | 0.263 | 750s | 0.090 | M |
| 16 | 4 | 0.064 | 2 | 1.080 | 828 | 1.019 | 760s | 0.338 | 823 | 0.195 | 760s | 0.060 | M |
| 17 | 5 | 0.064 | — | — | 815 | 1.081 | — | — | 816 | 1.117 | — | — | S |
| 18 | 5 | 0.064 | 2 | 1.080 | 766 | 0.574 | — | — | 826 | 0.400 | — | — | S |

The presence of deaggregant is indicated by the column heading "Add" (for additive). The letter 'a' in place of a number indicates that the maximum was almost non-existent. For coating 7, the densities were read at 820 to 830 nm and at 740 to 750 nm, respectively. For coating 10, the densities were read at 800 to 820 nm and 730 to 750 nm, respectively.

The comparison dyes 6, 7 and 8 were not coated with deaggregants since in the coatings they were already in a deaggregated state. They show strong absorption in the spectral region of interest. However, they also show severe post-processing stain.

The invention has been described in detail with particular reference to preferred embodiments thereof, but it will be understood that variations and modifications can be effected within the spirit and scope of the invention.

What is claimed is:

1. A photographic element comprising a support having thereon a hydrophilic colloid layer comprising infrared-sensitive silver halide and a hydrophilic colloid layer, which is the same as or different from said silver halide layer, comprising an amount effective as a photographic filter dye of a compound having the formula:

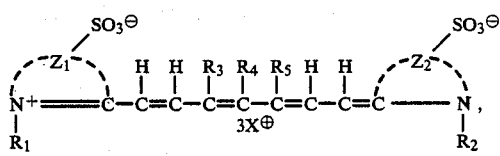

(I)

wherein:
- $R_1$ and $R_2$ each independently represents sulfoalkyl carboxyalkyl, or sulfatoalkyl containing from 3 to 6 carbon atoms, having at least 3 carbon atoms in the alkyl chain between the nitrogen atom of each Z ring and the sulfo or sulfato group, and at least 2 carbon atoms in the alkyl chain between the nitrogen of each Z ring and the carboxy group,
- $R_3$ and $R_5$ are each hydrogen or together represent the atoms necessary to complete a 5- or 6-membered carbocyclic ring,
- $R_4$ represents hydrogen, alkyl of 1 to 4 carbon atoms, aryl, cyano, halogen, or

where $R_6$ and $R_7$ each independentlly represents alkyl of from 1 to 6 carbon atoms or aryl or together represent the non-metallic atoms necessary to form a 5- or 6-membered heterocyclic ring,
$X^\oplus$ represents a cation, and
$Z_1$ and $Z_2$ each independently represents the atoms that complete an indole, naphthindole or benzindole nucleus.

2. A photographic element according to claim 1 wherein the dye is present in an amount of from 0.1 to 500 mg/ft².

3. A photographic element according to claim 1 further comprising, in the layer comprising the dye, a compound capable of deaggregating the dye, in an amount sufficient to deaggregate the dye.

4. A photographic element according to claim 3 wherein the dye is present in an amount of from 0.1 to 500 mg/ft² and wherein the deaggregating compound is present in an amount of from 25 to 10,000 weight percent, based on the weight of the dye.

5. A photographic element according to any of claims 1–4 wherein the dye has the structure:

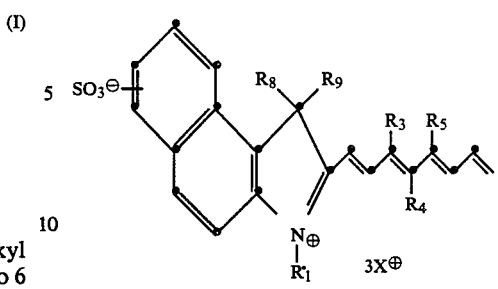

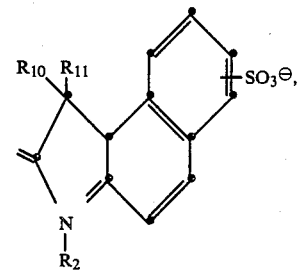

wherein $X^\oplus$, R1, R2, R3, R4, and R5, are as defined in claim 1,
$R_8$, $R_9$, $R_{10}$ and $R_{11}$ each independently represent methyl or ethyl, or
$R_8$ and $R_9$ or $R_{10}$ and $R_{11}$, taken together with the carbon atoms to which they are attached, may form a cycloalkyl group.

6. A photographic element according to claim 5 wherein the dye is in the silver halide layer.

7. A photographic element according to claim 5 wherein the dye isan antihalation dye present in a layer other than the silver halide layer.

8. A photographic element according to claim 3 or 4 wherein the deaggregating compound is selected from the group consisting of:
- 4,4'-bis[4,6-bis-(2-chloroanilino-s-triazin-2-yl)-amino[-2,2'-stilbenedisulfonic acid, disodium salt,
- bis[3-methyl-1-(p-sulfophenyl)-2-pyrazolin-5-one-(4)]methineoxonol,
- bis[3-methyl-1-(p-sulfophenyl)-2-pyrazolin-5-one-(4)]pentamethineoxonol,
- bis[3-methyl-1-(p-sulfophenyl)-2-pyrazolin-5-one(4)]-trimethineoxonol disodium salt, and
- bis(1-butyl-3-carboxymethyl-5-barbituric acid)trimethineoxonol.

* * * * *